United States Patent
Yoshihide et al.

(10) Patent No.: US 7,817,225 B2
(45) Date of Patent: Oct. 19, 2010

(54) POLARIZER WITH FIRST AND SECOND PATTERNS OF WIRES WHERE THE FIRST PATTERN OF WIRES IS POSITIONED REPEATEDLY AND RANDOMLY AMONG THE SECOND PATTERN OF WIRES

(75) Inventors: Nagata Yoshihide, Kanagawa (JP); Sato Atsushi, Kanagawa (JP); Ji Woo Kim, Yongin-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 379 days.

(21) Appl. No.: 11/436,908

(22) Filed: May 18, 2006

(65) Prior Publication Data

US 2006/0274272 A1    Dec. 7, 2006

(30) Foreign Application Priority Data

May 18, 2005    (JP)    ............................. 2005-145644

(51) Int. Cl.
*G02F 1/1335*    (2006.01)
*G02B 5/30*    (2006.01)

(52) U.S. Cl. .......................... 349/96; 359/483; 359/486
(58) Field of Classification Search ............... 349/96; 359/483–486, 489
See application file for complete search history.

(56) References Cited

U.S. PATENT DOCUMENTS

| 6,243,199 | B1 | 6/2001 | Hansen et al. |
| 6,739,723 | B1 * | 5/2004 | Haven et al. .................... 353/20 |
| 6,876,414 | B2 | 4/2005 | Hara et al. |
| 2002/0167727 | A1 * | 11/2002 | Hansen et al. ............... 359/486 |
| 2003/0117708 | A1 | 6/2003 | Kane |
| 2005/0046943 | A1 * | 3/2005 | Suganuma .................... 359/497 |
| 2005/0146720 | A1 * | 7/2005 | Hansen et al. ............... 356/370 |
| 2005/0180017 | A1 | 8/2005 | Hara et al. |
| 2006/0061862 | A1 * | 3/2006 | Mi et al. ...................... 359/486 |

FOREIGN PATENT DOCUMENTS

| JP | 2002-303731 | 10/2002 |
| JP | 2004-240297 | 8/2004 |
| KR | 10-2004-047328 | 6/2004 |
| KR | 10-2004-069341 | 8/2004 |
| KR | 10-2004-102166 | 12/2004 |

* cited by examiner

*Primary Examiner*—David Nelms
*Assistant Examiner*—Jessica M Merlin
(74) *Attorney, Agent, or Firm*—Lee & Morse, P.C.

(57) ABSTRACT

Disclosed herein is a backlight unit which has high utilization efficiency over the entire visible wavelength band. The backlight unit includes a reflective polarization splitter to allow a light of a surface light source to emit therethrough. The reflective polarization splitter includes a plurality of wires arranged in a wire grid shape. With this structure, when light of the surface light source passes through the wires, the wires passes only a certain polarized light, for example, s-polarized light having a vibration plane vertical to a longitudinal direction of the lattice wires therethrough, while reflecting other polarized components of the light according to the reflection coefficient of the wires.

32 Claims, 10 Drawing Sheets

POLARIZER WITH FIRST AND SECOND PATTERNS OF WIRES WHERE THE FIRST PATTERN OF WIRES IS POSITIONED REPEATEDLY AND RANDOMLY AMONG THE SECOND PATTERN OF WIRES

CROSS-REFERENCE TO RELATED PATENT APPLICATION

This application claims the benefit of Japanese Patent Application No. 2005-145644, filed on May 18, 2005, in the Japanese Patent Office, the disclosure of which is incorporated herein by reference in its entirety.

BACKGROUND OF THE INVENTION

1. Field of the Invention

The present invention relates to an optical device, more particularly, a backlight device for use in a liquid crystal display (LCD) or the like.

2. Description of the Related Technology

Since an LCD is not self-luminous, such an LCD basically uses a surface light source device arranged at the back side of the LCD, so called a "backlight." The amount of light emitted from such a surface light source device is finite. For this reason, in order to improve the screen brightness of the LCD, it is necessary to achieve an enhancement in utilization efficiency of light. To this end, attempts to enhance the utilization efficiency of light have been made in such a way of enhancing the brightness of the LCD with various optical elements disposed between the surface light source device and a liquid crystal panel, or the like.

Figure 12:
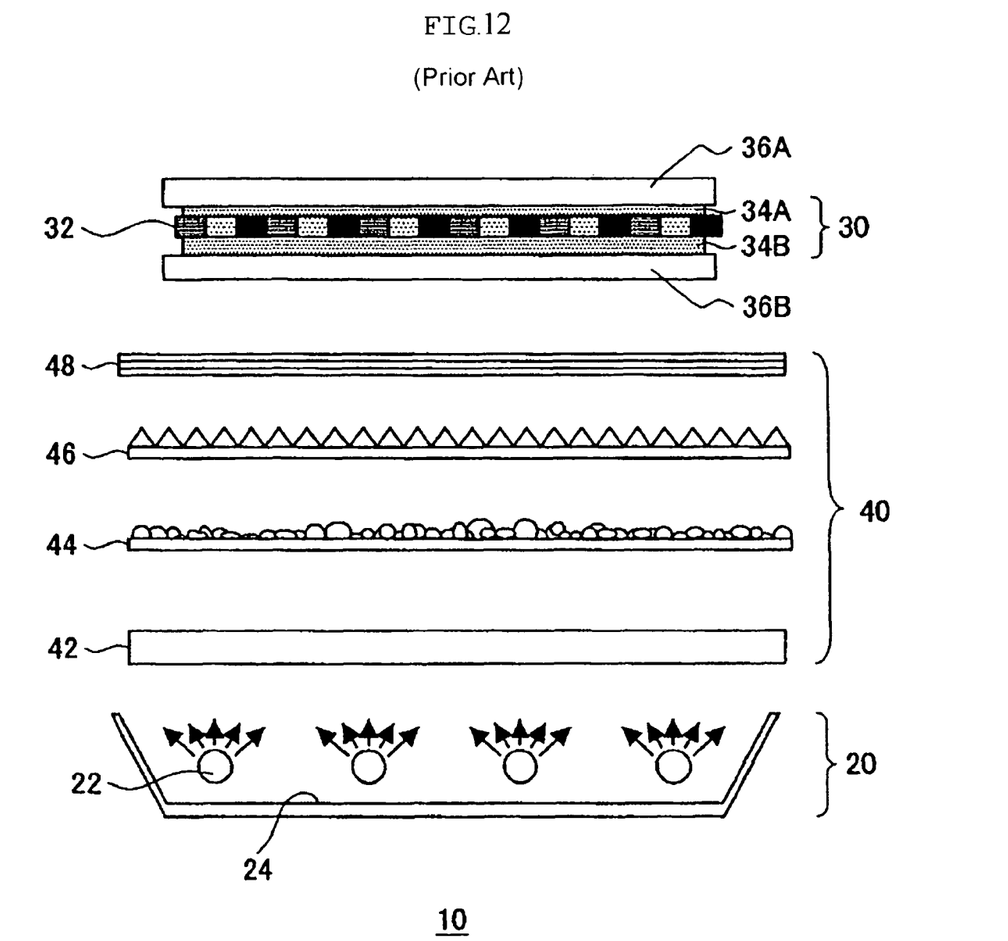
FIG. 12 is a cross-sectional view illustrating a schematic structure of a liquid crystal display comprising a conventional backlight unit.

FIG. 12 shows a conventional liquid crystal display 10. As shown in FIG. 12, the liquid crystal display 10 mainly comprises a light source 20, a liquid crystal panel 30, and an optical processing unit 40 interposed between the light source 20 and the liquid crystal panel 30. The light source 20 comprises a casing 24 having a reflective layer coated on an inner surface thereof, and a plurality of rod-shaped lamps 22, each of which is composed of a cold cathode fluorescent lamp (CCFL). The liquid crystal panel 30 comprises a liquid crystal cell 32, phase difference plates 34A and 24B having the liquid crystal cell 32 interposed therebetween, and polarization plates 36A and 36b having the phase difference plates 34A and 24B interposed therebetween. The optical processing unit 40 comprises a diffusion plate 42, a diffusion sheet 44, a prism sheet 46, and a brightness enhancing film 48 sequentially stacked from the light source 20 towards the liquid crystal panel 30.

The liquid crystal display performs a screen display function using a liquid crystal display diode as a shutter for light, and comprises the polarization plates 36A and 36B for the shutter function. Generally, since the polarization plates 36A and 36B absorb polarized components of light traveling in a direction of orthogonal to a transmission axis, utilization efficiency of light cannot enhance to 50% in theory.

In order to prevent loss in utilization efficiency of light while increasing the brightness, liquid crystal display is provided with a brightness enhancing film 48 which comprises a reflective polarization plate. The reflective polarization plate reflects the polarized component of light traveling in the direction of orthogonal to the transmission axis, and turns it back to the light source 20, thereby enhancing the utilization efficiency of light. One example of the reflective polarization plate is disclosed in Japanese Patent Laid-open No. 2002-303731.

A conventional polarization film is designed to maximize the utilization efficiency of light at the inherent wavelength of light. Although a visible light has a wavelength in the range of 400~700 nm, the conventional polarization film has a problem in that sufficient utilization effect of light cannot be achieved over the entire range of the visible wavelength band as described above.

SUMMARY OF CERTAIN INVENTIVE ASPECTS

An aspect of the invention provides, an optical device comprising a polarization splitter, which may comprise: a substrate; and a plurality of wires formed on the substrate and substantially parallel to one another, each wire having a first edge and a second edge formed along where each wire contacts the substrate, the second edge facing away from the first edge, each wire having a width between the first and second edges thereof, each of two neighboring wires define a slit between the second edge of one wire and the first edge of the other wire, each of two neighboring wires having a period defined by a distance between the first edges of the two neighboring wires, wherein the period varies over at least part of the plurality of wires. A period of two neighboring wires may be the sum of the width of one of the two neighboring wires and the width of the slit between the two neighboring wires. The width of each wire may vary over the plurality of wires. The width of the slit between the two neighboring wires may vary over the plurality of wires.

In the foregoing device, each period may be equal to or smaller than about the lower limit of wavelengths of visible light. Each period may be equal to or smaller than about 400 nm. At least part of the plurality of wires may comprise two neighboring wires forming a period equal to or smaller than about 300 nm. At least part of the plurality of wires may comprise two neighboring wires forming a period equal to or smaller than about 200 nm. The polarization splitter may be configured to polarize incident light thereto at a degree of about 90% or higher. At least part of the plurality of wires may comprise two neighboring wires forming a period smaller than $\lambda v/5$, where $\lambda v$ is a wavelength of light incident to the wires. Each period may be smaller than $\lambda v/5$, where $\lambda v$ is a wavelength of light incident to the wires. The plurality of wires may comprise no two neighboring wires having a period greater than 400 nm.

Still in the foregoing device, the device may further comprise a layer formed over the substrate, wherein the layer comprises a material substantially transparent with respect to visible light, wherein the plurality of wires are buried in the layer. The at least part of the plurality of wires in which the period varies may be repeated. The device may be selected from the group consisting of a liquid crystal display (LCD), a reflective polarization splitter for use in an LCD, a surface lighting device for use in an LCD.

Still in the forgoing device, the device may further comprise a light source configured to emit light toward the polarization splitter. The device may further comprise a liquid crystal panel, wherein the polarization splitter is positioned between the light source and the liquid crystal panel. The device may further comprise a filter having an uneven surface.

Another aspect of the invention provides a method of making a liquid crystal display, which may comprises: providing a liquid crystal panel; providing a light source; placing the foregoing optical device between the liquid crystal panel and the light source. The device may further comprise a dichroic polarizer.

Still another aspect of the invention provides a method of displaying an image, which may comprises: providing the foregoing optical device; projecting light toward the plurality of wires formed on the substrate, thereby polarizing the projected light; and supplying polarized light toward a liquid crystal panel so as to display an image on a surface of the liquid crystal panel.

Further aspect of the invention provides an optical device for use in a liquid crystal display having a liquid crystal panel, which may comprise: a light source; a polarization splitter configure to be positioned between the light source and the liquid crystal panel, the polarization splitter comprising a substrate and a plurality of wires formed on the substrate and substantially parallel to one another, each wire having a first edge and a second edge formed along where each wire contacts the substrate, the second edge facing away from the first edge, each wire having a width between the first and second edges thereof, each of two neighboring wires define a slit between the second edge of one wire and the first edge of the other wire, each of two neighboring wires having a period defined by a distance between the first edges of the two neighboring wires; and wherein the polarization splitter is configured to polarize light from the light source and supply the polarized light toward a liquid crystal panel for displaying image therethrough.

In the foregoing device, each period may be equal to or smaller than about 400 nm. At least part of the plurality of wires may comprise two neighboring wires forming a period equal to or smaller than about 300 nm. At least part of the plurality of wires may comprise two neighboring wires forming a period equal to or smaller than about 200 nm. The polarization splitter may be configured to polarize incident light thereto at a degree of about 90% or higher. At least part of the plurality of wires may comprise two neighboring wires forming a period smaller than $\lambda v/5$, where $\lambda v$ is a wavelength of light incident to the wires. Each period may be smaller than $\lambda v/5$, where $\lambda v$ is a wavelength of light incident to the wires. The plurality of wires of the polarization splitter may face to the light source, and the substrate may face away from the light source.

Still in the foregoing method, the device may further comprise a layer formed over the substrate, wherein the layer comprises a material substantially transparent with respect to visible light, wherein the plurality of wires are buried in the layer. The device may further comprise a filter having an uneven surface. The device may further comprise a dichroic polarizer.

A further aspect of the present invention provides a backlight unit, and a liquid crystal display comprising the same, which have an improved utilization efficiency of light. In particular, this aspect of the present invention provides a backlight unit, and a liquid crystal display comprising the same, which can maximize the utilization efficiency of light over the entire range of a visible wavelength band.

In accordance with one aspect of the present invention, a backlight unit comprises a reflective polarization splitter to allow the light of a surface light source to emit therethrough, the reflective polarization splitter including a plurality of lattice wires arranged in a wire grid shape, and a high transmittance thin film overcoat on the wires. With this structure, when the light of the surface light source passes through the wires, the wires allows only a certain polarized component or light, for example, s-polarized light having a vibration plane vertical to a longitudinal direction of the lattice wires to pass therethrough, while reflecting other polarized components of the light according to the reflection coefficient of the wires.

In this structure, the lattice wires may be uniformly arranged at a period (P) less than or equal to 400 nm which is the lower limit of a visible wavelength band $\lambda v$. Since the visible wavelength band is in the range of 400 nm~700 nm, utilization efficiency of light can be maximized over the entire visible wavelength band by the reflective polarization splitter which comprises the lattice wires arranged at the period (P) less than or equal to 400 nm which is the lower limit of the visible wavelength band $\lambda v$.

In this regard, the period (P) may be 700 nm or less, which is less than or equal to the upper limit of the visible wavelength band, the period (P) may be preferably 400 nm or less, which is less than or equal to the lower limit of the visible wavelength band, thereby further enhancing the effect. In addition, when considering an incident path of light, the period (P) is more preferably 300 nm or less, and further preferably, 200 nm or less. In addition, in order to achieve sufficient effect of the present invention, it is preferable that $P<<\lambda v$. For example, it is reported that a condition of $P<\lambda v/5$ can provide a polarization degree of 90% or more.

In another structure of the reflective polarization splitter, the lattice wires may be randomly or irregularly arranged at a period (P) less than or equal to 400 nm. With this structure, the reflective polarization splitter provides excellent polarization efficiency for light having various wavelengths in the visible wavelength band irrespective of lower polarization efficiency for a specific wavelength in comparison to the case where the wires are arranged at an equal period.

The reflective polarization splitter may comprise a light transmittance substrate, and a plurality of metal wires as the lattice wires arranged in parallel to form the grid on an upper surface of the light transmittance substrate by deposition or the like such that the wires faces a light source side. With this structure, the wires formed from a suitable metal of high reflectance rate acts to reflect polarized light (for example, p-polarized light) having a vibration plane parallel to the wires towards the light source, so that the light can be reused, and brightness enhancement can be obtained by an amount that loss of light intensity is suppressed.

In addition, the reflective polarization splitter may be further provided with a dichroic polarizer at a light emitting side thereof. The dichroic polarizer acts to absorb and shield polarized light in an undesired direction, which can be incident to a liquid crystal panel and become stray light, so that contrast of light is enhanced.

Here, the reflective polarization splitter may be integrated to the dichroic polarizer via flat surfaces thereof, thereby reducing the loss in light intensity caused by reflection on an interface therebetween.

In addition, the reflective polarization splitter may be further provided with an irregular surface plate, such as a prism sheet having prisms arranged thereon, to focus an incident light from the light source side to a front side of the surface either at the light source side or at the light emitting side thereof, thereby enhancing brightness in the emitting direction.

When the irregular surface plate acting as a brightness enhancing element is positioned at the light emitting side of the reflective polarization splitter, the reflective polarization splitter may be integrated to the irregular surface plate via flat surfaces thereof, thereby reducing the loss of light intensity caused by reflection on the interface therebetween.

In accordance with another aspect of the present invention, a liquid crystal display comprises a backlight unit constructed as described above.

BRIEF DESCRIPTION OF THE DRAWINGS

The above and other features and advantages of the present invention will become more apparent by describing in detail exemplary embodiments thereof with reference to the attached drawings in which.

DESCRIPTION OF EMBODIMENTS

Preferred embodiments of the present invention will be described in detail with reference to the accompanying drawings, in which like components are denoted by the same reference numerals, and repetitious descriptions thereof will be omitted.

In an embodiment of the invention, referring to the drawings a liquid crystal display 100 includes a liquid crystal panel 300 and a back light device. The back light device comprises a light source 200 and a polarization splitter 540. The polarization splitter 540 is positioned between the light source 200 and the liquid crystal panel 300. The back light device preferably further has an uneven filter 520 and a dichroic polarizer 560.

Figure 2:
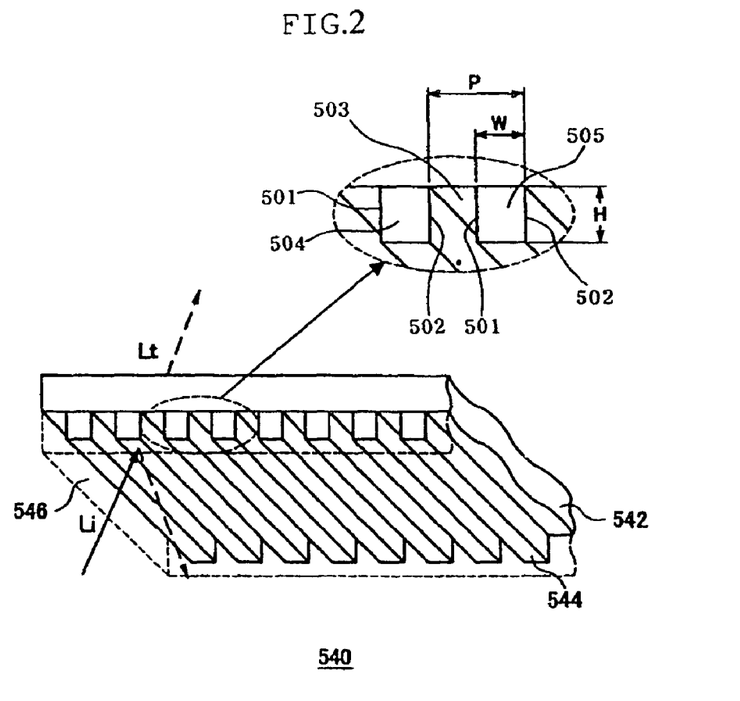
FIG. 2 is an explanatory drawing illustrating a principle of wire grid polarizer having wires arranged at an equal period in the backlight unit in accordance with the embodiment.

The polarization splitter includes a substrate 542 and a plurality of wires 544 formed on the substrate 542 and substantially parallel to one another. Each wire 544 has a first edge 501 and a second edge 502 which are formed along where the wire contacts the substrate 542. The second edge 502 faces away from the first edge 501. Each wire 544 has a width (W) between the first and second edges thereof, and each of two neighboring wires has a slit 503 between the second edge 502 of one wire 504 and the first edge 501 of the other wire 505. Each of two neighboring wires 504 and 505 has a period (P) defined by a distance between the first edges 501 of the two neighboring wires 504 and 505.

In embodiments, the period (P) varies over at least part of the plurality of wires. Generally, the period (P) of two neighboring wires is the sum of the width (W) of one of the two neighboring wires 504 and 505 and the width of the slit between the two neighboring wires 504 and 505. The at least part of the plurality of wires in which the period varies may be repeated in one embodiment. Each period (P) may be smaller than about the lower limit of wavelengths of visible light. Each period (P) may be smaller than about 400 nm. In an embodiment, the plurality of wires has no two neighboring wires having a period (P) greater than 400 nm. In one embodiment, the width (W) of the plurality of wires may vary. The width of the slit between two neighboring wires 504 and 505 may vary over at least part of the plurality of wires varies in another embodiment.

In one embodiment, the polarization splitter 540 has a layer 546 formed over the substrate and the wires so as to bury the wires 544. This layer comprises a material substantially transparent with respect to visible light.

Figure 1:
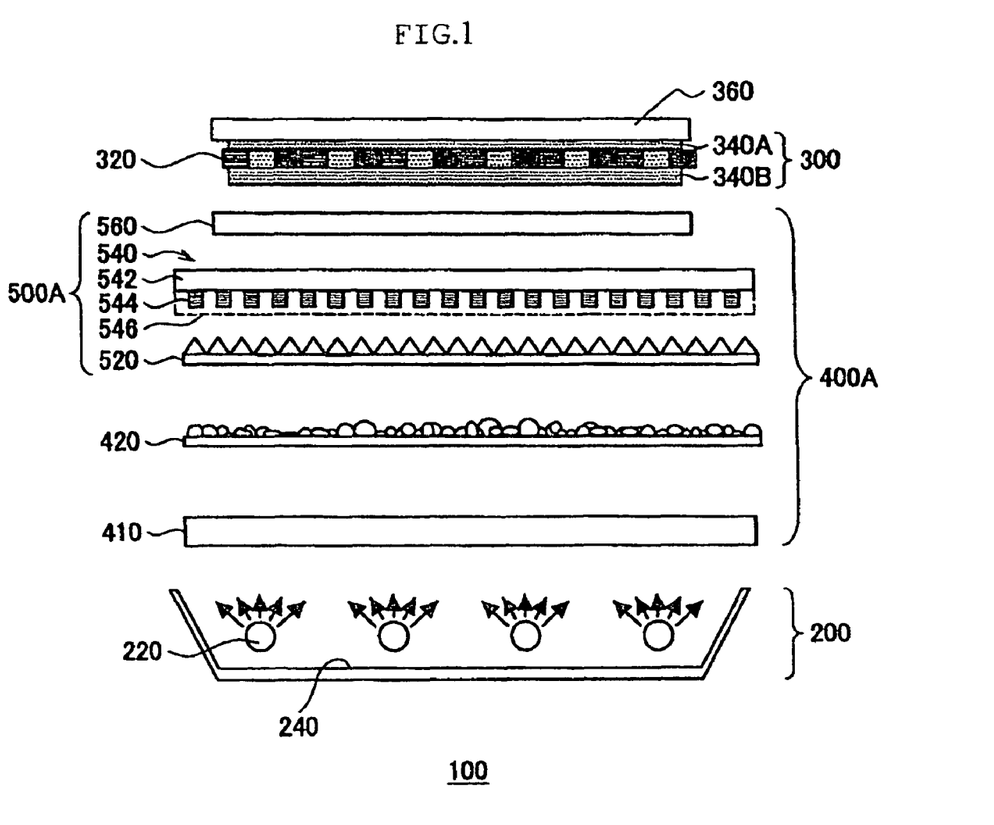
FIG. 1 is a cross-sectional view illustrating a schematic structure of a liquid crystal display comprising a backlight unit in accordance with a first embodiment of the present invention.

With reference to FIG. 1, a liquid crystal display 100 comprising a surface light source device (backlight unit) in accordance with an embodiment of the present invention will be described hereinafter. As shown in FIG. 1, the liquid crystal display 100 comprises a light source 200, a liquid crystal panel 300, and an optical processing unit 400/400A interposed between the light source 200 and the liquid crystal panel 300.

The light source 200 comprises a casing 240 having a reflective layer coated on an inner surface thereof, and a plurality of rod-shaped lamps 220, each of which is, for example, a cold cathode fluorescent lamp (CCFL). Although the light source 200 is described as comprising the rod-shaped lamps 220 in this embodiment, the present invention is not limited to this structure. Alternatively, the light source 200 may be implemented by a light emitting diode (LED) light source which comprises plural combinations of R-LED, G-LED and B-LED arranged therein. In addition, although not illustrated, various embodiments of the present invention can be applied to not only these kinds of direct type surface light source device as described above, but also an edge type surface light source device, which has a light source disposed at an edge so as to be used as the surface light source via a light guide plate.

In the illustrated embodiment, the liquid crystal panel 300 includes a liquid crystal cell 320, phase difference plates 340A and 340B having the liquid crystal cell 320 interposed therebetween, and a polarization plate 360 positioned at a display plane side. More specifically, in the conventional liquid crystal display 10, the phase difference plates 34A and 34B are interposed between the polarization plates 36A and 36B as shown in FIG. 12. However, in the liquid crystal display 100 of this embodiment, since a dichroic polarizer 560 provides a function of the polarization plate 36B at the light source side, it is possible to omit the polarization plate 36B. However, it is needless to say that an additional polarization plate such as the polarization plate 36B may be inserted to the liquid crystal panel 300, if desired.

The optical processing unit 400A includes all or part of the following elements: a diffusion plate 410, a diffusion sheet 420, an irregular surface plate 520, a reflective polarization splitter 540, and the dichroic polarizer 560. In one embodiment, all the elements of the optical processing unit 400A are sequentially stacked from the light source 200 towards the liquid crystal panel 300. In the following discussion, the irregular surface plate 520, the reflective polarization splitter 540, and the dichroic polarizer 560 are together referred to as a polarization unit 500, 500A, 500B, 500C, 500D or 500E.

According to one embodiment, the diffusion plate 410 and the diffusion sheet 420 diffuse the light from the light source. The diffusion plate 410 is an optical element formed by dispersing a diffusion agent in a light transmission material such as a transparent resin. The diffusion plate 410 first diffuses light from the light source 200 such that the shape of the light source is not transparent. The diffusion sheet 420 has a rough surface which further diffuses the light from the light source or light that has passed the diffusion plate 410.

Figure 5:
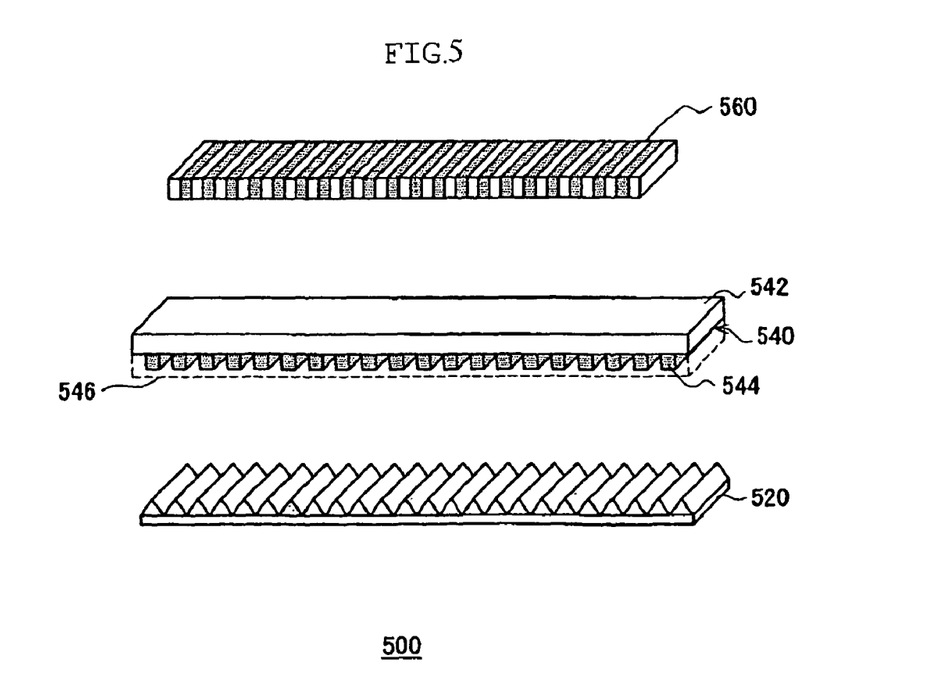
FIG. 5 is an exploded perspective view illustrating the structure of a polarization unit 500 of the backlight unit in accordance with the embodiment.

Referring to FIG. 5, the irregular surface plate 520 is an optical element inserted to enhance brightness of light in a frontal direction. The irregular surface plate 520 may be constituted by a prism sheet which has a plurality of prisms arranged on the surface thereof to guide incident light from the light sources toward the front side of the surface. The irregular surface plate 520 is formed by shaping an optically transparent resin material, such as poly(ethylene terephthalate) (PET), polymethylmetacrylate (PMMA), polyethylenenaphthalate (PEN), cyclo-olefin polymer (COP), polycarbonate (PC), cyclo-olefin copolymer (COC), polyethylene (PE), polypropylene (PP), transparent polystyrene (PS), methylmethacrylate-styrene monomer copolymer (MS), etc., into a predetermined shape such as a sheet or a plate shape. Additionally, it is desirable that a light diffusion agent be mixed with the transparent resinous material.

Next, the reflective polarization splitter 540 will be described hereinafter. The reflective polarization splitter 540 employs the principle of a wire grid polarizer (WGP). As shown in FIG. 2, according to this principle, when a period (P) is much smaller than a wavelength $\lambda$ of an incident light (Li), i.e. $\lambda \gg P$, transmitted light Lt through the WGP consists of polarized light (for example, s-polarized light) which has a vibration plane vertical to a longitudinal direction of wires. See, J. P. Auton, *Infrared Transmission Polarizer by Photolithography*, Applied Physics, Vol. 6, P. 1023 (1967), disclosing the principle of the WGP. With the WGP type reflective polarization splitter 540, the s-polarized component of light is transmitted therethrough, whereas other polarized components of light are absorbed or reflected as a reflected light (Lr) according to a reflection coefficient of the wires.

According to this embodiment, the reflective polarization splitter 540 is formed by disposing a number of lattice wires 544 arranged in substantially parallel on a light transmittance substrate 542 via deposition or the like. In one embodiment, a high transmittance thin film overcoat 546 is formed over the lattice wires 544, as shown in FIG. 2. The light transmittance substrate 542 is formed by shaping an optically transparent resinous material, such as poly(ethylene terephthalate) (PET), polymethylmetacrylate (PMMA), polyethylenenaphthalate (PEN), cyclo-olefin polymer (COP), polycarbonate (PC), cyclo-olefin copolymer (COC), polyethylene (PE), polypropylene (PP), transparent polystyrene (PS), methylmethacrylate-styrene monomer copolymer (MS), etc., into a predetermined shape such as a film shape or a plate shape. The wires 544 can be formed by a number of different materials that are not transparent with respect to visible light. In some embodiment, the lattice wires may be formed of a metal having high reflectance, such as Al, Ag, Au, Pt, etc. As such, the wires 544 formed from a suitable metal of high reflectance rate acts to reflect a certain polarized light (for example, p-polarized light) having a vibration plane parallel to the lattice wires towards the light source, so that the light can be reused, and brightness enhancement can be obtained by the amount that loss of light intensity is suppressed. The overcoat 546 is formed by coating any one highly transparent resin including an acryl-base resin or by bonding the highly transparent resin onto the resultant structure.

Although the wires are illustrated as comprising rectangular-shaped wires in FIG. 2, it should be noted that various other shaped wires may be used in various embodiments. In some embodiments, the cross-sectional shape of the wire may be triangular, trapezoid, etc. Further, the corners of the wires may be sharp or rounded. In terms of height H or width W, the lattice wires may have various dimensions according to required optical characteristics.

Referring to FIG. 2, the wires are generally uniformly arranged at an equal period to constitute a wire grid. The period (P) between the lattice wires is less than or equal to the wavelength $\lambda v$ of 700 nm. With the structure as described above, when light passes through the wires, the wires allows only a certain polarized component of light, for example, s-polarized light having the vibration plane vertical to the longitudinal direction of each lattice wire to pass therethrough, while reflecting the other polarized components of light according to the reflection coefficient of the wires.

In embodiments, the period (P) can be 700 nm or less, which is less than or equal to the upper limit of the visible wavelength band. In one embodiment, the period (P) may be about 400 nm or less, which is less than or equal to the about lower limit of the visible wavelength band. In other embodiments, the period (P) may be about 300 nm or less, and in the alternative, the period (P) may be about 200 nm or less. In one embodiment, it is preferable that $P \ll \lambda v$. For example, it is reported that a condition of $P < \lambda v/5$ can provide a polarization degree of about 90% or higher.

Figure 10A:
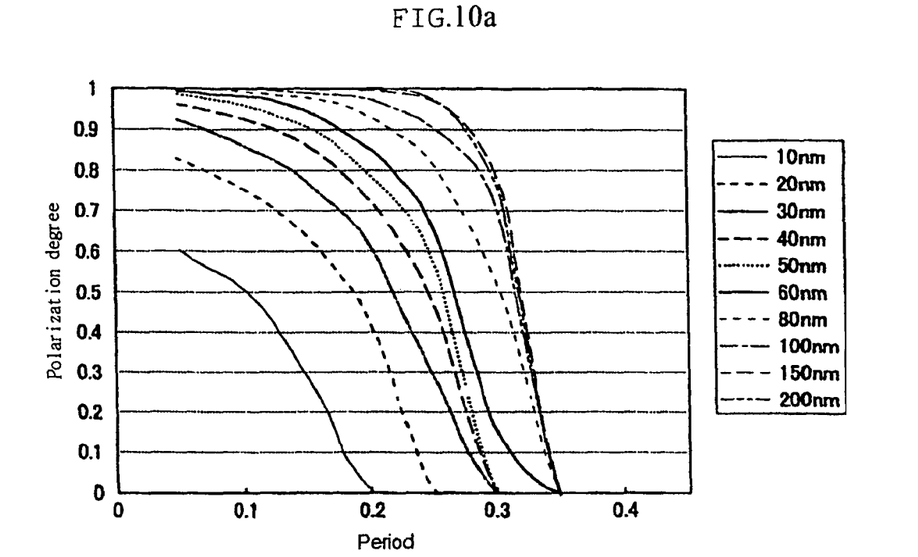
FIGS. 10a and 10b are graphs depicting correlations between polarization degree and period, and between absorbance (absorption loss) and period when light having a wavelength of 545 nm is incident perpendicular to a reflective polarization splitter 540, respectively.
Figure 10B:
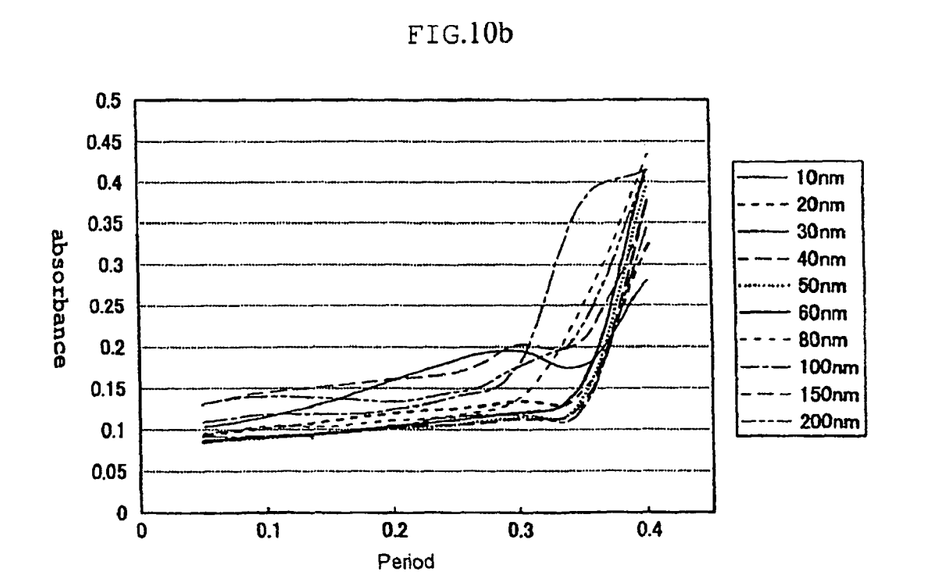

FIGS. 10a and 10b are graphs depicting correlations between polarization degree and period, and between absorbance (absorption loss) and period when light having a wavelength of 545 nm is incident perpendicular to the reflective polarization splitter 540, respectively. As shown in FIGS. 10a and 10b, although it differs depending on the thickness of the lattice wire, the polarization degree for light incident perpendicular to the wires is lowered, and the absorption loss by the wires is increased under the condition wherein the period (P) is greater than 300 nm, i.e., P>300 nm, in which the term "polarization degree" means a degree of polarizing light to either s-polarized light or p-polarized light when the light passes through the wires. As a result, in one embodiment, the period (P) is set to 300 nm or less.

Figure 11A:
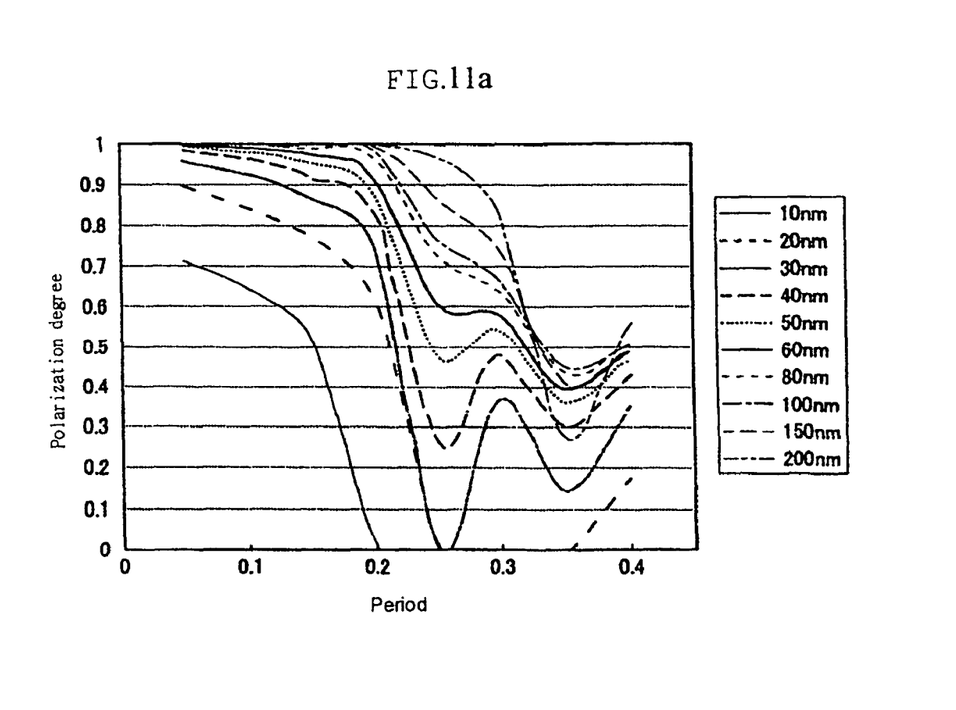
FIGS. 11a and 11b are graphs depicting correlations between polarization degree and period, and between absorbance (absorption loss) and period when light having a wavelength of 545 nm is incident at an angle of 45 degrees to the reflective polarization splitter 540, respectively.
Figure 11B:
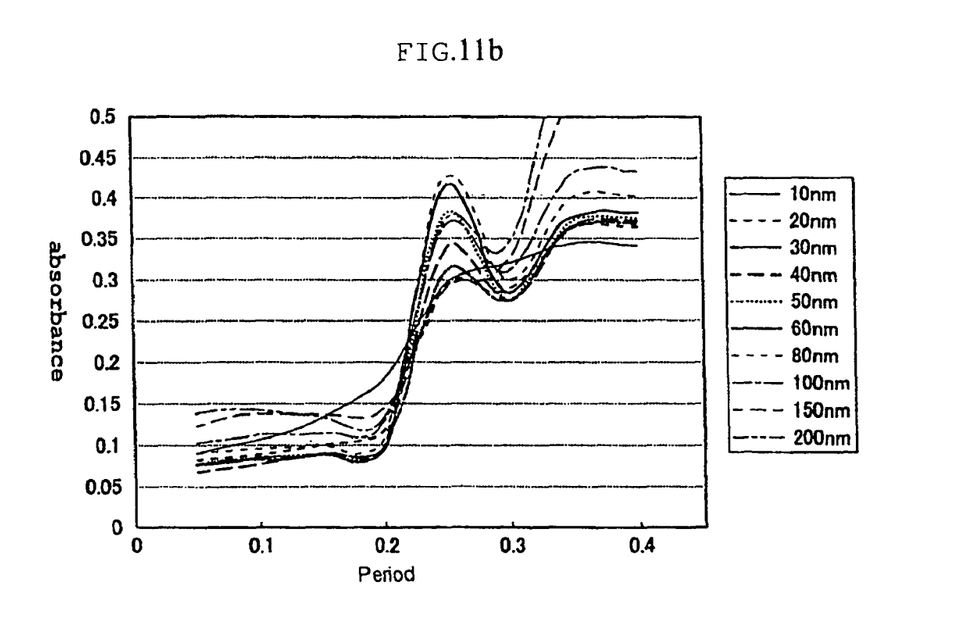

FIGS. 11a and 11b are graphs depicting correlations between polarization degree and period, and between absorbance (absorption loss) and period when light having a wavelength of 545 nm is incident at an angle of 45 degrees to the reflective polarization splitter 540, respectively. As shown in FIGS. 11a and 11b, although it differs depending on the thickness of the wires, the polarization degree for light incident at an angle to the wires is lowered, and the absorption loss by the wires is increased under the condition wherein the period (P) is greater than 200 nm, i.e., P>200 nm. In one embodiment, considering an inclined incidence of light, it can be understood that the period (P) may be set to 200 nm or less.

Figure 3:
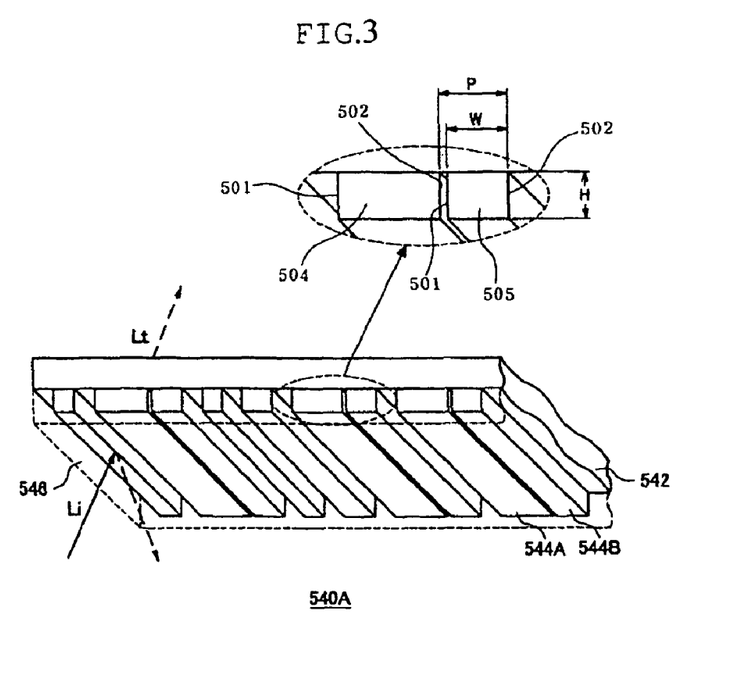
FIG. 3 is an explanatory drawing illustrating the principle of wire grid polarizer having wires arranged at a various period in the backlight unit in accordance with the embodiment.
Figure 4:
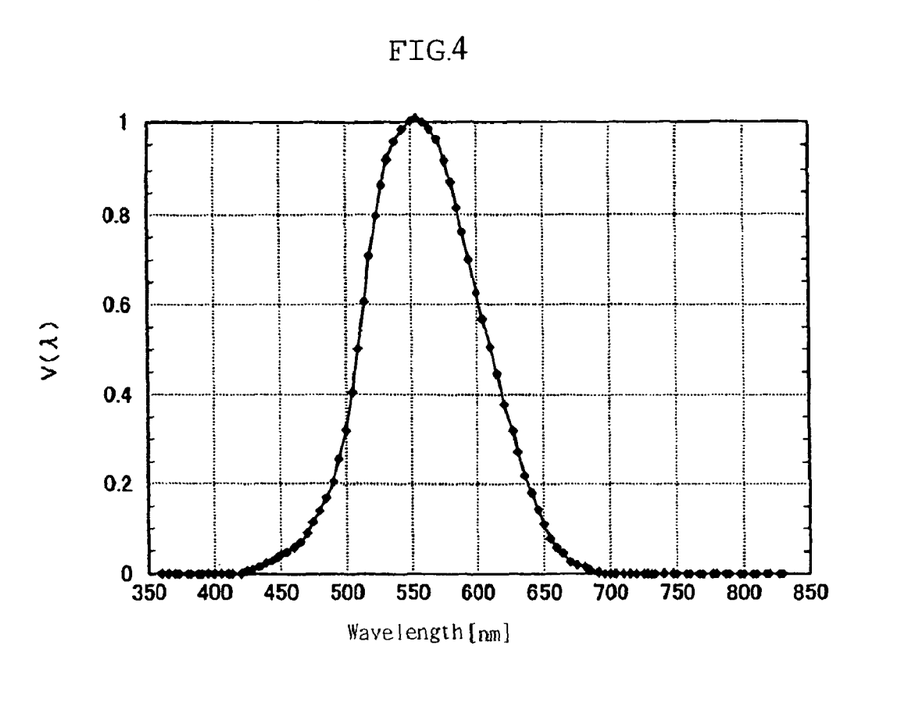
FIG. 4 is a graph depicting a visible wavelength band of light.

Although the wires are arranged at an equal period in FIG. 2, lattice wires 544a and 544B may be randomly or irregularly arranged as shown in FIG. 3. In comparison to the case where the lattice wires are arranged at an equal period, the structure wherein the lattice wires are randomly or irregularly arranged exhibits excellent polarization efficiency for light having various wavelengths in the visible wavelength band irrespective of lower polarization efficiency for a specific wavelength. As in the case of the wires arranged at the equal period, the period (P) can be 700 nm or less, which is less than or equal to the upper limit of the visible wavelength band. In some embodiments, the period (P) is 400 nm or less, which is less than or equal to the lower limit of the visible wavelength band. In one embodiment, the period (P) is 300 nm or less. In another embodiment, the period (P) is 200 nm or less.

According to one embodiment, the polarization unit 500A comprises the dichroic polarizer 560 disposed on the surface of the reflective polarization splitter 540. The dichroic polarizer 560 has a function of transmitting polarized light of one direction while absorbing polarized light orthogonal to the one direction. Here, when a polarization split of the reflective polarization splitter 540 is not sufficient, polarized light in an undesired direction may pass through the reflective polarization splitter 540 into the liquid crystal panel, and may become stray light. The result would be that the contrast of the liquid crystal display may be lowered. As such, with the dichroic polarizer 560 disposed on the surface of the reflective polarization splitter 540, the stray light is shielded by the dichroic polarizer 560, so that the contrast is enhanced.

As such, according to one embodiment, the polarization unit 500 of the liquid crystal display 100 shown in FIG. 1 has the structure wherein the irregular surface plate 520, the reflective polarization splitter 540, and the dichroic polarizer 560 are sequentially disposed from the light source side toward the light emitting side, as shown in FIG. 5. However, it should be noted that the present invention is not limited to this structure. Instead, according to various embodiments, a very suitable backlight unit can be implemented via various combinations of the above optical components being applied in different arrangements according to utility of the backlight unit. Several such embodiments will be further described hereinafter.

Figure 6:
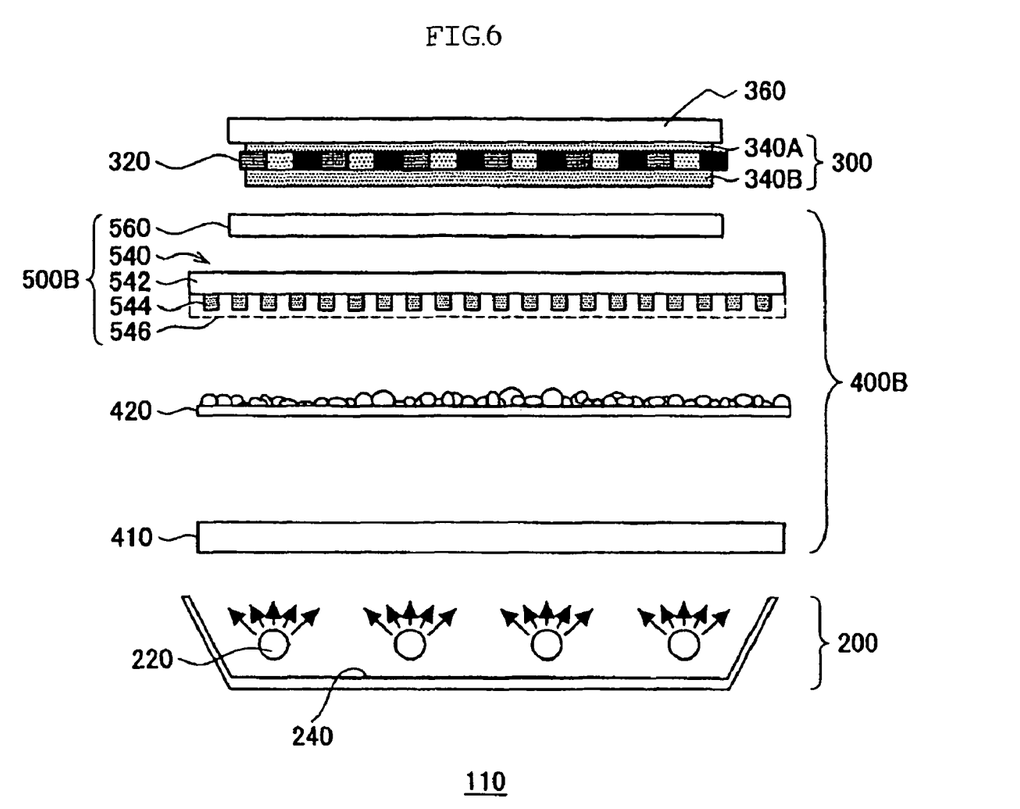
FIG. 6 is a cross-sectional view illustrating a schematic structure of a liquid crystal display comprising a backlight unit in accordance with a second embodiment of the present invention.

FIG. 6 shows a liquid crystal display 110 which comprises an optical processing unit 400B having a polarization unit 500B. Components of the liquid crystal display 110 having the same functions as those of the liquid crystal display 100 will be referred to by the same reference numerals, and repetitious description thereof will be omitted. The polarization unit 500B shown in FIG. 6 does not comprise the irregular surface plate 520 of the polarization unit 500A shown in FIG. 1. The optical processing unit 400B comprises a reflective polarization splitter 540, and a dichroic polarizer 560 sequentially disposed from a light source side toward a liquid crystal panel side. With this structure, since light of a surface light source with a sufficient brightness extends to the polarization unit 500B, the backlight unit of the embodiment can be used for applications, which does not require brightness enhancement by the irregular surface plate 520.

Figure 7:
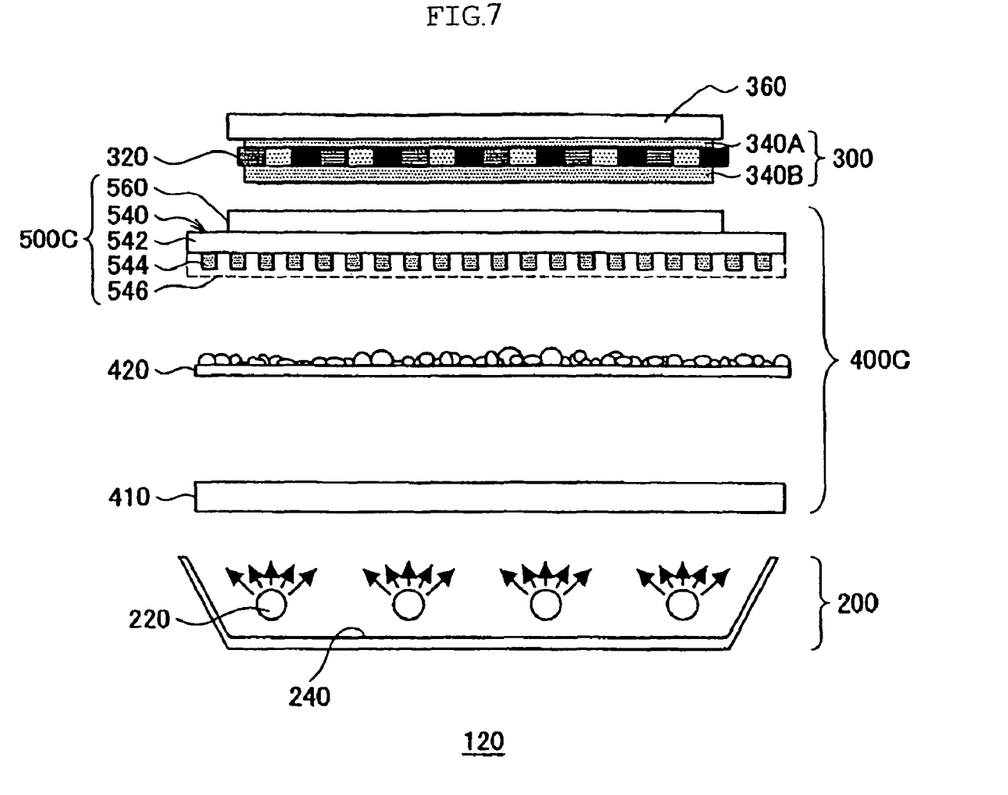
FIG. 7 is a cross-sectional view illustrating a schematic structure of a liquid crystal display comprising a backlight unit in accordance with a third embodiment of the present invention.

FIG. 7 shows a liquid crystal display 120 which comprises an optical processing unit 400C having a polarization unit 500C. Components of the liquid crystal display 110 having the same functions as those of the liquid crystal display 100 will be referred to by the same reference numerals, and repetitious description thereof will be omitted. In addition to the structure of the polarization unit 500B shown in FIG. 6, the polarization unit 500C shown in FIG. 7 comprises a reflective polarization splitter 540 and a dichroic polarizer 560 as an integral component by tightly bonding flat surfaces thereof to each other. With this structure, the optical processing unit 400C can further reduce loss of light intensity caused by reflection on an interface between the reflective polarization splitter 540 and the dichroic polarizer 560 in addition to the effect of the polarization unit 500B shown in FIG. 6.

Figure 8:
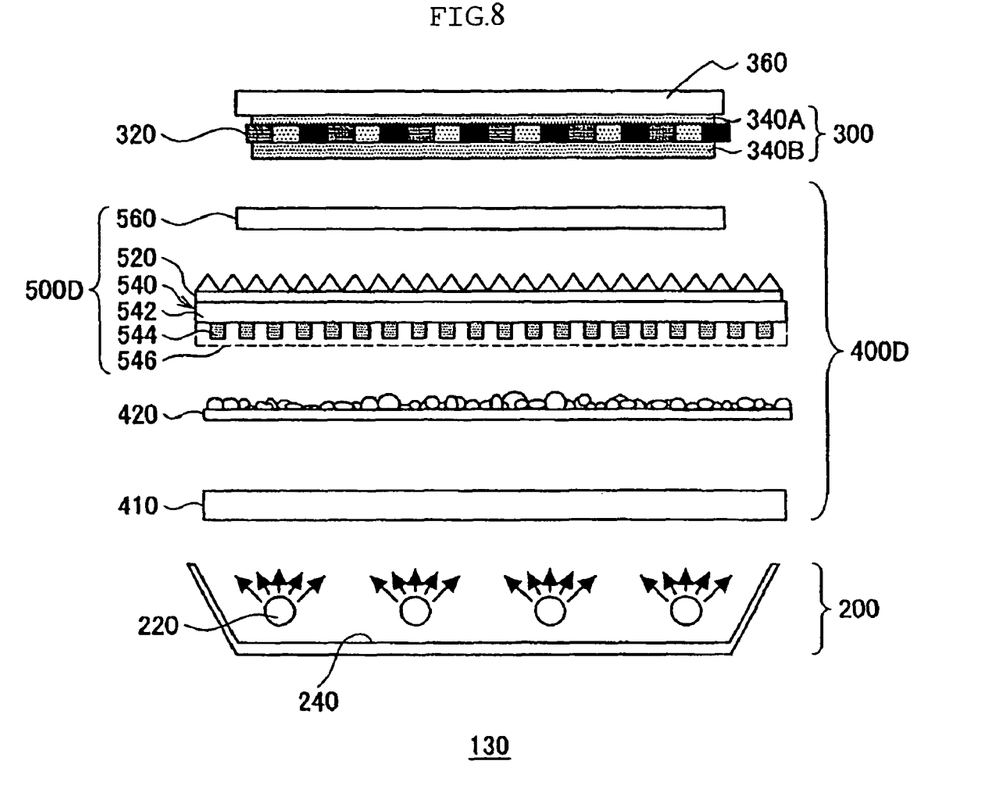
FIG. 8 is a cross-sectional view illustrating a schematic structure of a liquid crystal display comprising a backlight unit in accordance with an fourth embodiment of the present invention.

FIG. 8 shows a liquid crystal display 130 which comprises an optical processing unit 400D having a polarization unit 500D. Components of the liquid crystal display 130 having the same functions as those of the liquid crystal display 100 will be referred to by the same reference numerals, and repetitious description thereof will be omitted. In comparison to the polarization unit 500A shown in FIG. 1, the polarization unit 500D shown in FIG. 8 comprises an irregular surface plate 520 inserted between a reflective polarization splitter 540 and a dichroic polarizer 560. In addition, the irregular surface plate 520 is integrated to the reflective polarization splitter 540 by tightly bonding flat surfaces thereof to each other, thereby reducing loss of light intensity caused by reflection on an interface therebetween.

With this structure, when light converted into a surface light source by the diffusion plate 410 and the diffusion sheet 420 passes through the polarization unit, the reflective polarization splitter 540 acts to allow only the s-polarized light, in an example, to pass therethrough, and the irregular surface plate 520 arrange flux of light in the frontal direction while the dichroic polarizer 560 further enhances the brightness of light. Meanwhile, in FIG. 8, although the irregular surface plate 520 is integrated to the reflective polarization splitter 540, the irregular surface plate 520 and the reflective polarization splitter 540 can be provided as separate components.

Figure 9:
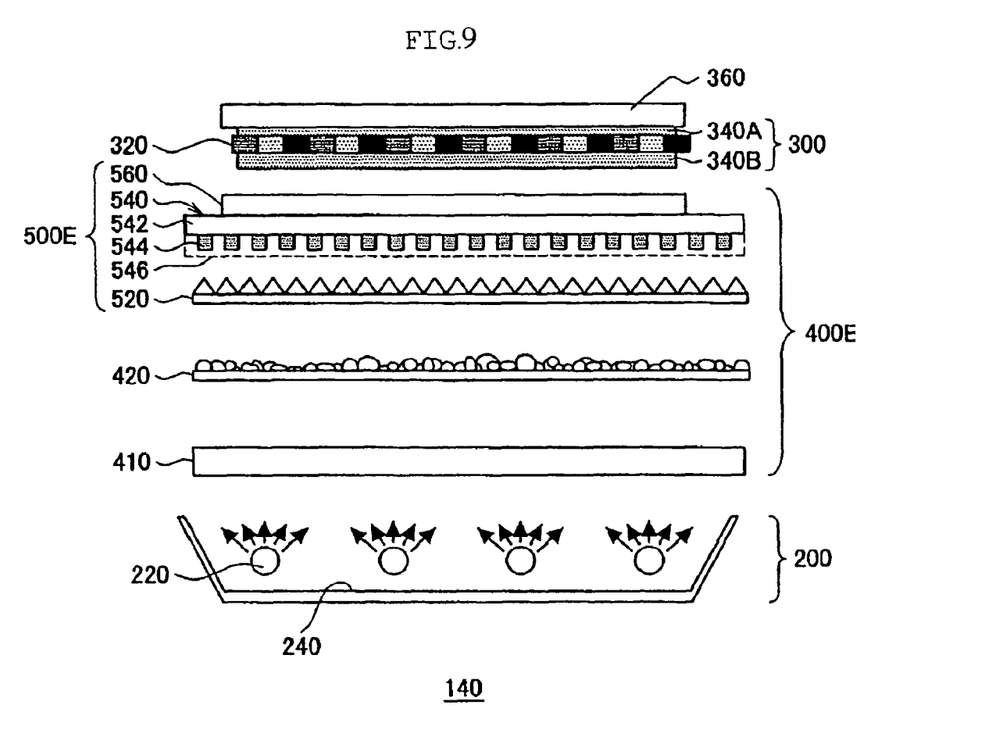
FIG. 9 is a cross-sectional view illustrating a schematic structure of a liquid crystal display comprising a backlight unit in accordance with a fifth embodiment of the present invention.

FIG. 9 shows a liquid crystal display 140 which comprises an optical processing unit 400E having a polarization unit 500E. Components of the liquid crystal display 140 having the same functions as those of the liquid crystal display 100 will be referred to by the same reference numerals, and repetitious description thereof will be omitted. In comparison to the polarization unit 500A shown in FIG. 1, the polarization unit 500E shown in FIG. 9 comprises a reflective polarization splitter 540 and a dichroic polarizer 560 as an integral component formed by tightly bonding flat surfaces thereof to each other. With this structure, the optical processing unit 400C can further reduce the loss of light intensity caused by reflection on an interface therebetween in addition to the effect of the polarization unit 500A shown in FIG. 1.

As apparent from the above description, according to the present invention, the backlight unit, and the liquid crystal display comprising the same can maximize utilization efficiency of light over the entire range of the visible wavelength band.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A polarization splitter, comprising:
   a substrate; and
   a plurality of wires including a first pattern of wires and a second pattern of wires on the substrate, wherein:
   the first pattern of wires occurs repeatedly in the plurality of wires,
   the second pattern of wires occurs repeatedly in the plurality of wires, and the first pattern of wires is a predetermined pattern positioned repeatedly and randomly among the second pattern of wires on at least a part of the substrate, wherein:
the plurality of wires are substantially parallel to one another, each wire of the plurality of wires having a first edge and a second edge where the wire contacts the substrate, the second edge facing away from the first edge, and having a width between the first and second edges thereof,
two directly adjacent wires of the plurality of wires define a slit between the second edge of one wire and the first edge of the other wire, and
a period of the plurality of wires is defined as a distance between the first edges of two directly adjacent wires of the plurality of wires, the period varying irregularly over at least part of the plurality of wires in accordance with the predetermined pattern.

2. The polarization splitter of claim 1, wherein a period of two directly adjacent wires of the plurality of wires is defined as the sum of the width of one of the two directly adjacent wires and the width of the slit between the two directly adjacent wires.

3. The polarization splitter of claim 1, wherein the width of the wires varies over the plurality of wires.

4. The polarization splitter of claim 1, wherein the width of the slits varies over the plurality of wires.

5. The polarization splitter of claim 1, wherein each period is equal to or smaller than about the lower limit of wavelengths of visible light.

6. The polarization splitter of claim 1, wherein each period is equal to or smaller than about 400 nm.

7. The polarization splitter of claim 1, wherein at least part of the plurality of wires comprises two directly adjacent wires forming a period equal to or smaller than about 300 nm.

8. The polarization splitter of claim 1, wherein at least part of the plurality of wires comprises two directly adjacent wires forming a period equal to or smaller than about 200 nm.

9. The polarization splitter of claim 1, wherein the polarization splitter is configured to polarize incident light thereto at a degree of about 90% or higher.

10. The polarization splitter of claim 1, wherein at least part of the plurality of wires comprises two directly adjacent wires forming a period smaller than $\lambda v/5$, where $\lambda v$ is a wavelength of light incident to the wires.

11. The polarization splitter of claim 1, wherein each period is smaller than $\lambda v/5$, where $\lambda v$ is a wavelength of light incident to the wires.

12. The polarization splitter of claim 1, further comprising a layer on the substrate, wherein the layer includes a material substantially transparent with respect to visible light, wherein the plurality of wires is buried in the layer.

13. The polarization splitter of claim 1, wherein the at least part of the plurality of wires in which the period varies is repeated.

14. The polarization splitter of claim 1, wherein the plurality of wires does not comprise two directly adjacent wires having a period greater than 400 nm.

15. A method of making a liquid crystal display, the method comprising:
providing a liquid crystal panel;
providing a light source;
placing the polarization splitter of claim 1 between the liquid crystal panel and the light source.

16. A method of displaying an image, comprising:
providing the polarization splitter of claim 1;
projecting light toward the plurality of wires formed on the substrate, thereby polarizing the projected light; and
supplying the polarized projected light toward a liquid crystal panel so as to display an image on a surface of the liquid crystal panel.

17. The polarization splitter of claim 1, wherein:
the first pattern of wires includes:
a first wire and a second wire, the first wire being directly adjacent to the second wire and having a predetermined width that is wider than that of the second wire;
a first slit between the first wire and the second wire; and
a second slit adjacent to the second wire such that the second wire is between the first and second slits, the first slit having a predetermined width that is narrower than that of the second slit,
the second pattern of wires includes:
a third wire and a fourth wire, the third and fourth wires being directly adjacent to one another and each being narrower than the first wire;
a third slit between the third wire and the fourth wire; and
a fourth slit adjacent to the fourth wire such that the fourth wire is between the third and fourth slits, the third and fourth slits each being wider than the first slit,
the wires of the plurality of wires are arranged in a predetermined arrangement of the first and second patterns of wires.

18. The polarization splitter of claim 17, wherein at least two sets of wires having the first pattern of wires are disposed directly adjacent to one another.

19. The polarization splitter of claim 18, wherein at least one set of wires having the second pattern of wires is arranged between two sets of wires having the first pattern of wires.

20. The polarization splitter as claimed in claim 1, wherein the predetermined pattern includes a plurality of directly adjacent first wires, the directly adjacent first wires being arranged repeatedly and randomly as a single unit among second wires.

21. The polarization splitter as claimed in claim 20, wherein the predetermined pattern includes two directly adjacent first wires having different widths, the two directly adjacent first wires being arranged together repeatedly and randomly among the second wires.

22. A liquid crystal display, comprising:
a liquid crystal panel;
a light source;
a polarization splitter positioned between the light source and the liquid crystal panel, the polarization splitter including:
a substrate; and
a plurality of wires including a first pattern of wires and a second pattern of wires on the substrate, wherein:
the first pattern of wires occurs repeatedly in the plurality of wires,
the second pattern of wires occurs repeatedly in the plurality of wires, and
the first pattern of wires is a predetermined pattern positioned repeatedly and randomly among the second pattern of wires on at least a part of the substrate, wherein:
the plurality of wires are substantially parallel to one another, each wire of the plurality of wires having a first edge and a second edge where the wire contacts the substrate, the second edge facing away from the first edge, and having a width between the first and second edges thereof, two directly adjacent wires of the plurality of wires define a slit between the second edge of one wire and the first edge of the other wire, and a period of the plurality of wires is defined as a distance between the first edges of two directly adjacent wires of the plurality of wires, the period varying irregularly over at least part of the plurality of wires in accordance with the predetermined pattern.

23. The liquid crystal display of claim 22, wherein each period is equal to or smaller than about 400 nm.

24. The liquid crystal display of claim 22, wherein at least part of the plurality of wires comprises two directly adjacent wires forming a period equal to or smaller than about 300 nm.

25. The liquid crystal display of claim 22, wherein at least part of the plurality of wires comprises two directly adjacent wires forming a period equal to or smaller than about 200 nm.

26. The liquid crystal display of claim 22, wherein the polarization splitter is configured to polarize incident light thereto at a degree of about 90% or higher.

27. The liquid crystal display of claim 22, wherein at least part of the plurality of wires comprises two directly adjacent wires forming a period smaller than $\lambda v/5$, where $\lambda v$ is a wavelength of light incident to the wires.

28. The liquid crystal display of claim 22, wherein the plurality of wires of the polarization splitter faces to the light source, and the substrate faces away from the light source.

29. The liquid crystal display of claim 22, further comprising a layer on the substrate, wherein the layer includes a material substantially transparent with respect to visible light, wherein the plurality of wires is buried in the layer.

30. The liquid crystal display of claim 22, further comprising a filter having an uneven surface, wherein the filter having the uneven surface is attached to the polarization splitter without having an air gap therebetween.

31. The liquid crystal display of claim 22, further comprising a dichroic polarizer, wherein the dichroic polarizer is attached to the polarization splitter without having an air gap therebetween.

32. The liquid crystal display of claim 22, wherein:

the first pattern of wires includes:
- a first wire and a second wire, the first wire being directly adjacent to the second wire and having a predetermined width that is wider than that of the second wire;
- a first slit between the first wire and the second wire; and
- a second slit adjacent to the second wire such that the second wire is between the first and second slits, the first slit having a predetermined width that is narrower than that of the second slit, the second pattern of wires includes:
- a third wire and a fourth wire, the third and fourth wires being directly adjacent to one another and each being narrower than the first wire;
- a third slit between the third wire and the fourth wire; and
- a fourth slit adjacent to the fourth wire such that the fourth wire is between the third and fourth slits, the third and fourth slits each being wider than the first slit, the wires of the plurality of wires are arranged in a predetermined arrangement of the first and second patterns of wires.

* * * * *